United States Patent
Carras et al.

(10) Patent No.: US 11,719,625 B2
(45) Date of Patent: Aug. 8, 2023

(54) PHOTOACOUSTIC GAS SENSOR USING A METHOD FOR MODULATING THE ILLUMINATION WAVELENGTH

(71) Applicant: MIRSENSE, Palaiseau (FR)

(72) Inventors: Mathieu Carras, Gentilly (FR); Guillaume Aoust, Massy (FR)

(73) Assignee: MIRSENSE, Palaiseau (FR)

(*) Notice: Subject to any disclaimer, the term of this patent is extended or adjusted under 35 U.S.C. 154(b) by 347 days.

(21) Appl. No.: 17/264,271

(22) PCT Filed: Jul. 25, 2019

(86) PCT No.: PCT/EP2019/070028
§ 371 (c)(1),
(2) Date: Jan. 28, 2021

(87) PCT Pub. No.: WO2020/025437
PCT Pub. Date: Feb. 6, 2020

(65) Prior Publication Data
US 2021/0293696 A1  Sep. 23, 2021

(30) Foreign Application Priority Data
Aug. 3, 2018 (FR) .................................. 1857314

(51) Int. Cl.
*G01N 21/17* (2006.01)
*G01N 21/39* (2006.01)

(52) U.S. Cl.
CPC ......... *G01N 21/1702* (2013.01); *G01N 21/39* (2013.01); *G01N 2021/1704* (2013.01); *G01N 2021/396* (2013.01)

(58) Field of Classification Search
CPC .... G01N 21/1702; G01N 21/39; G01N 21/14; G01N 21/2425; G01N 2021/1704; G01N 2021/396; G01N 2291/021
See application file for complete search history.

(56) References Cited

U.S. PATENT DOCUMENTS 6,552,792 B1    4/2003  Pilgrim et al.
8,302,461 B2 *  11/2012 Angster ............. G01N 29/4481
                                              73/31.04
(Continued)

FOREIGN PATENT DOCUMENTS

WO    2008/026183 A1    3/2008
WO    2014/132046 A2    9/2014

OTHER PUBLICATIONS

Holthoff, et al., "Photoacoustic Spectroscopy for Trace Vapor Detection and Standoff Detection of Explosives", Chemical, Biological, Radiological, Nuclear, and Explosives (CBRNE) Sensing XVII, vol. 9824, p. 98240R, 2016.

(Continued)

*Primary Examiner* — Suman K Nath
(74) *Attorney, Agent, or Firm* — BakerHostetler (57) ABSTRACT

A photo-acoustic gas sensor using a method for modulating the wavelength of the laser radiation, the modulation being obtained via judicious use of an electric current, called the generation current, which pumps the one or more laser sources, and is configured to cause the one or more laser sources to operate in pulsed mode, and of a current, called the base current, which takes non-zero values between each laser pulse with a lower magnitude than the magnitude of the generation current, the magnitude of base current being modulated so that the one or more laser sources emit, into the cell, light radiation having a wavelength that varies periodically about a central wavelength so as to take, at regular intervals, a value specifically suitable for the excitation of a gas to be detected, whereby an interaction between the light radiation and the gas to be detected contained in the cell induces the generation of acoustic waves at a resonant frequency of the cell.

13 Claims, 5 Drawing Sheets

(56) References Cited

U.S. PATENT DOCUMENTS

2008/0011055 A1* 1/2008 Riddle ............... G01N 21/1702
                                                    73/24.02
2009/0128819 A1* 5/2009 Van Kesteren .... G01N 21/1702
                                                    356/437
2018/0196012 A1   7/2018 Blanchard et al.

OTHER PUBLICATIONS

Saarela et al, "Wavelength modulation waveforms in laser photoacoustic spectroscopy", Appl. Opt., vol. 48, No. 4, pp. 743-747, Feb. 1, 2009.
Schilt, et al., "Wavelength modulation photoacoustic spectroscopy: Theoretical description and experimental results", Infrared Physics & Technology, vol. 48, Issue 2, pp. 154-162, Jun. 1, 2006.

* cited by examiner

PHOTOACOUSTIC GAS SENSOR USING A METHOD FOR MODULATING THE ILLUMINATION WAVELENGTH

CROSS-REFERENCE TO RELATED APPLICATIONS

This application is a National Stage of International patent application PCT/EP2019/070028, filed on Jul. 25, 2019, which claims priority to foreign French patent application No. FR 1857314, filed on Aug. 3, 2018, the disclosures of which are incorporated by reference in their entirety.

FIELD OF THE INVENTION

The present invention relates to photo-acoustic gas sensors.

BACKGROUND

Photo-acoustic spectroscopy (PA) is a qualitative and quantitative analysis technique that allows the composition of various solids, liquids and gases to be determined. The technique is based on the interaction of laser radiation with a material, said interaction allowing an acoustic wave to be generated, which is then analyzed in order to characterize the studied material. This technique is particularly suitable for gas detection using monochromatic sources, on account of the natural selectivity of the line absorption spectrum of gas atoms. The rapid development of compact infrared laser sources over the last decade (laser diodes for example) has transformed gas detection by PA into a robust, compact and simple solution. The analysis of gas by PA requires a laser source that is pulsed, or continuous-wave and the intensity and/or wavelength of which is modulated, a cell forming an acoustic resonator containing the gas to be analyzed and a detection microphone. The PA effect in gas detection may be separated into 4 steps: (1) the laser radiation is absorbed by the gas, thus exciting rotational, electronic and vibrational energy levels; (2) In the case of ro-vibrational excitations, the gas will preferentially relax via molecular collisions, which result in a transfer of rotational/vibrational energy and kinetic energy, creating localized heating of the gas. Radiative emission is not predominant in the case of ro-vibrational excitations because of the long lifetime of the ro-vibrational radiative levels compared to that of non-radiative levels at the pressures conventionally used in PA (~1 bar). In practice, the energy absorbed by the gas is completely transferred in the form of heat by translation of kinetic energy to the gas atoms; (3) an acoustic wave and a thermal wave caused by the expansion due to heating of the gas are generated; (4) the acoustic signal is detected by the microphone. The amplitude of vibration of the microphone is representative of the concentration of the gas and the wavelength of laser radiation absorbed by the gas indicates its composition.

In the vast majority of cases, in gas analysis, the PA signal produced by the interaction between the laser and the studied gas is amplified before detection using an acoustic cell that has a resonance at a certain frequency. Obviously, this requires the generated PA signal to have the same frequency as the resonant frequency of the cell. To achieve this, it is known to modulate the amplitude of the laser radiation at the resonant frequency of the cell, this causing modulation of the PA signal at the same frequency. There are many forms of modulation of the amplitude of laser radiation, which are separated into two categories: continuous-wave photo-acoustics and pulsed photo-acoustics.

Pulsed photo-acoustics uses pulsed optical sources or continuous-wave sources with an external mechanical or electro-optical modulator, see for example the article by Ellen L. Holthoff, Logan S. Marcus and Paul M. Pellegrino "Photoacoustic Spectroscopy for Trace Vapor Detection and Standoff Detection of Explosives" Chemical, Biological, Radiological, Nuclear, and Explosives (CBRNE) Sensing XVII (Vol. 9824, p. 98240R). International Society for Optics and Photonics. In order to generate a PA signal at the resonant frequency of the cell, it is known to use sources that operate in a quasi-continuous-wave (QCW) regime. In this case, the amplitude of the laser is modulated at a frequency, the so-called repetition frequency, much higher than that of the resonance of the cell, so that the laser radiation appears to be continuous-wave from the point of view of the modulation frequency corresponding to the acoustic resonance.

However, amplitude modulation, whether in continuous-wave or pulsed regime, has the drawback of generating an acoustic signal, this signal being produced by the interaction between the laser radiation and the walls of the cell. Specifically, this interaction is liable to appear on misalignment of the optics of the gas sensor as a result of shocks or vibrations. Now, the amplitude of the PA signal produced by said interaction is proportional to the amplitude of the laser radiation. This means that the amplitude of this signal is modulated by the modulation of the laser amplitude and it is therefore generated at the same frequency (modulation frequency). This photo-acoustic signal is a sound that will add to the PA signal originating from the gas, which may disrupt determination of the real amplitude of the latter and therefore the precise determination of the concentration of the studied gas.

In photo-acoustics, it is also known to modulate the wavelength of the laser radiation as shown by J. Saarela et al, "Wavelength modulation waveforms in laser photoacoustic spectroscopy" Appl. Opt. 48, 743-747 (2009). In this case, the laser wavelength is modulated about an absorption peak of the studied gas. The modulation of the laser wavelength in theory allows noise originating from the interaction between the laser radiation and the walls of the cell to be prevented from disturbing the determination of the concentration of the studied gas. Specifically, the PA signal thus produced does not depend or depends very little on wavelength because the walls are wideband absorbers. This implies that the amplitude of the total PA signal returned by the gas and the walls is determined solely by the concentration of the studied gas species. However, modulating wavelength often involves varying the laser intensity, this causing the appearance of the parasitic PA signal produced by the interaction between the cell walls and the laser radiation. This is the case with semiconductor lasers, with which it is possible to vary the wavelength of the laser radiation by modifying the temperature of the active region of the laser. This is done by varying the supply current, which will also cause a variation in laser intensity. For example, document US 2018/0196012 A1 discloses a pulsed photo-acoustic spectroscopy system using a wavelength-modulating method allowing background noise to be overcome via a differential measurement.

SUMMARY OF THE INVENTION

One of the aims of the present invention is to mitigate the aforementioned difficulty: gas sensors that use laser-radiation-modulating methods that generate parasitic acoustic signals.

In order to solve this problem, the invention provides a photo-acoustic gas sensor that uses a method for modulating the wavelength of the laser radiation, said modulation being obtained via judicious use of an electric current pumping the one or more laser sources.

To this end, the invention provides a photo-acoustic gas sensor comprising:

a cell forming an acoustic resonator, comprising a gas inlet duct, a gas outlet duct and at least one aperture called the laser inlet;

at least one electrically pumped laser source;

at least one electro-acoustic transducer; and a supply circuit that generates a pulsed electric current, called the generation electric current, that pumps the one or more laser sources and that is configured to cause the one or more laser sources to operate in pulsed mode, the repetition frequency of the laser pulses being at least 10 times, preferably 100 times, more preferably 1000 times higher than the resonant frequency of the cell; characterized in that the supply circuit is configured to furthermore generate a current, called the base current, that takes non-zero values between laser pulses (preferably between most of the pulses, or even between each thereof) with a magnitude lower than the magnitude of the generation current during the laser pulses, the magnitude of the base current being modulated so that the one or more laser sources emit, into the cell, light radiation having a wavelength that varies periodically about a central wavelength so as to take, at regular intervals, a value specifically suitable for excitation of a gas to be detected, whereby an interaction between the light radiation and the gas to be detected contained in the cell induces the generation of acoustic waves at a resonant frequency of the cell, the electro-acoustic transducer being arranged so as to make contact with the acoustic waves generated in the cell.

The following are preferred but non-limiting aspects of the gas sensor according to the invention:

the modulation of the base current is sinusoidal.

the magnitude of the base current generated by the supply circuit is lower than the laser-emission threshold.

the modulation of the base current is of PWM type (PWM standing for Pulse Width Modulation) or of PDM type (PDM standing for Pulse Density Modulation).

the magnitude of the generation electric current is modulated so as to compensate for a decrease in the efficiency of the one or more lasers, which decrease is caused by heating of the active region of the one or more lasers by the base current, so as to obtain a constant laser intensity.

the base current is periodically modulated at a frequency equal to half the resonant frequency of the cell.

the sensor comprises a plurality of laser sources of different central wavelengths, suitable for the excitation of different gases.

the one or more laser sources comprise quantum cascade lasers that emit at wavelengths comprised between 4 and 10 microns.

the duration of the laser pulses is shorter than 100 ns.

Another subject of the invention is a method for detecting a gas by means of a photo-acoustic gas sensor according to one of the preceding embodiments, comprising:

a step in which the supply circuit generates the base current between each pulse with a magnitude that is non-zero and lower than the magnitude of the generation current during the laser pulses and the generation current, which pumps the one or more lasers, is configured to cause the one or more lasers to operate in pulsed mode, the magnitude of said base current being modulated so that said or each said laser source emits, into the cell, which forms an acoustic resonator, light radiation having a wavelength that varies periodically about a central wavelength so as to take, at regular intervals, a value specifically suitable for the excitation of a gas to be detected, the generation electric current being modulated so as to compensate for a decrease in the efficiency of the one or more lasers, which decrease is caused by heating of the active region of the one or more lasers by the base current, so as to obtain a constant laser intensity, and a step of detecting a periodic photo-acoustic signal produced during the interaction between the gas and the laser radiation, using the electro-acoustic transducer of the sensor.

According to particular embodiments of such a method:

the frequency of the periodic variation of the laser wavelength is equal to half the resonant frequency of the cell.

the gas sensor comprises a plurality of laser sources of different central wavelengths, suitable for the excitation of different gases.

the one or more laser sources comprise quantum cascade lasers that emit between 4 and 10 microns.

BRIEF DESCRIPTION OF THE DRAWINGS

Advantages and features of the subject matter of the description will become apparent on reading the description, which is illustrated by the following figures.

DETAILED DESCRIPTION

In the figures, elements that are identical have been designated with the same references.

Figure 1:
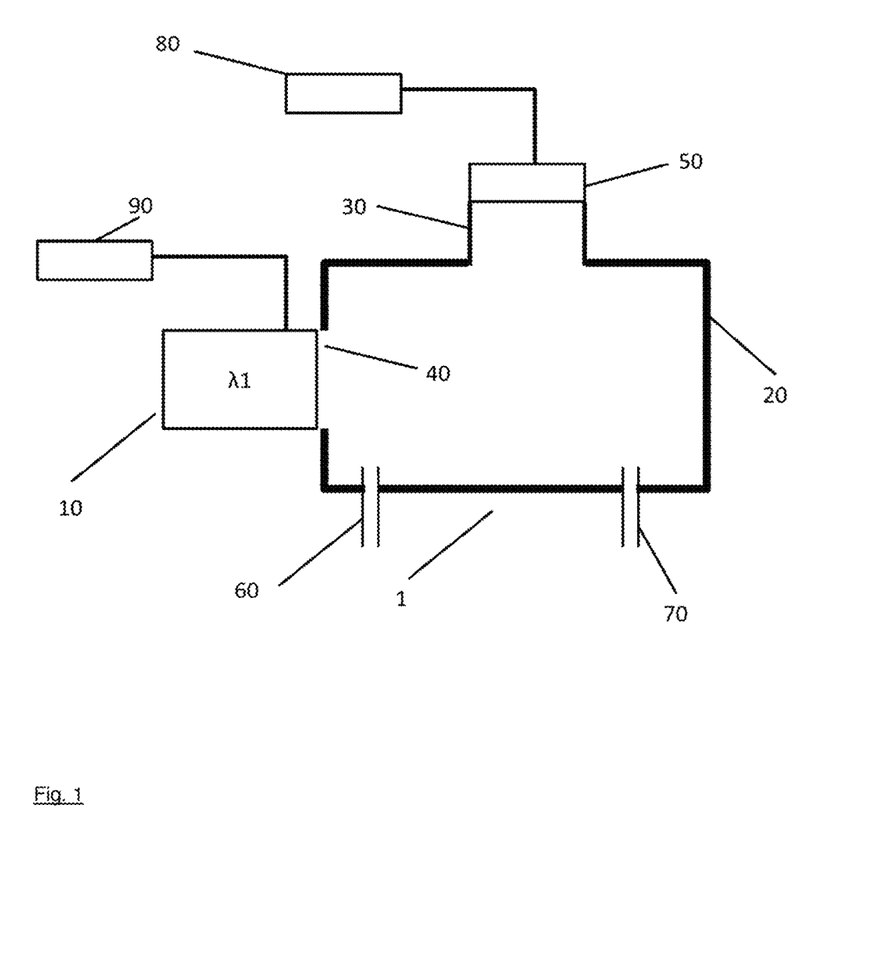
FIG. 1 shows a diagram of a gas sensor according to a first embodiment of the present invention.

FIG. 1 illustrates a first embodiment of a photo-acoustic gas sensor according to the present description. It comprises a cell 20 comprising a gas inlet duct 60 and a gas outlet duct 70, a laser source 10, a chimney 30 that opens into the cell and that contains a detection microphone 50, and an aperture called the laser inlet 40. The laser inlet is an aperture in the cell of a size larger than the diameter of the beam that enters into the cell. In another embodiment, the laser inlet is not an actual aperture, but a laser entry window, i.e. a transparent wall which does not adversely affect, or if so negligibly, the geometric properties of the beam during its propagation (optical aperture). In this case again, the size of the laser inlet is larger than the diameter of the beam that enters into the cell. In the embodiment of FIG. 1, the laser source 10 is right next to the laser input 40, so that the laser radiation is emitted directly into the cell 20, without interposition of optical focusing elements. In the embodiment of FIG. 1, the laser source 10 comprises a laser resonator, and a supply and modulation circuit 90 that allows the laser wavelength to be adjusted by varying the supply current. This laser source may, for example, operate in pulsed regime at a frequency much higher than the resonant frequency of the cell, in order to avoid possible interference. The sensor in addition comprises an electronic detection circuit 80 connected to the detection microphone 50. In the embodiment of FIG. 1, the gas is introduced through an inlet duct 60 and evacuated through an outlet duct 70. The two ducts are connected directly to the cell 20. During the interaction between the laser and the gas, within the cell 20, the gas is excited. The excited ro-vibrational levels will relax via non-radiative transitions that cause molecular collisions and heating of the gas. Thus, acoustic and thermal waves are generated and the acoustic waves will be detected by the detection microphone 50 placed in the chimney 30 which connects the microphone 50 to the cell 20. The microphone is connected to a detection circuit 80 that allows the amplitude of the acoustic waves and thus the concentration of the studied gas species to be determined. Since the laser source is placed directly in front of the entrance face, this embodiment requires only rapid alignment. In addition, not using an optical focusing element in the architecture of the sensor allows it to be made much more resistant to shocks and/or vibrations, less sensitive to misalignment and less expensive. This architecture therefore increases its operating life and its spectrum of application. In another embodiment, the sensor comprises focusing optics that allow a collimated laser beam that is directed toward an absorber located facing the laser sources to be obtained, this embodiment minimizes interactions between the laser beams and the walls of the cavity.

In the embodiment of FIG. 1, the laser radiation is produced by a quantum cascade laser (QCL) emitting in a pulsed regime at 4 to 10 microns. The QCL laser takes the form of a rod the typical dimensions of which are 3 mm×10 μm×20 μm. To make the QCL laser easier to handle, it is soldered to a parallelepipedal base of 5 mm×6 mm×1.2 mm size. The divergence of the laser beam at the output of the laser rod is typically 60°. The laser source allows light radiation at a central wavelength specifically suitable for the generation of the photo-acoustic effect in the gas to be studied to be emitted into the cell 20. In this embodiment, the cell possesses an acoustic resonant frequency at about 2 kHz. The QCL laser operates in a quasi-continuous-wave (QCW) regime with a repetition rate of 1 MHz with pulses of a duration of 100 ns. This mode of operation implies that the laser radiation appears to be continuous-wave from the point of view of the frequency of modulation of the wavelength of the QCLs.

Since the laser radiation is not focused within the cell, it will diverge and undergo multiple reflections from the walls of the cell. The absorption of the light radiation by the walls of the cell will cause the generation of an acoustic "background" signal that will mainly depend on the material from which the cell is made and that will depend very little on the wavelength of the laser source because the walls are wideband absorbers. This PA signal is noise, which adds to the PA signal originating from the gas and which will be detected by the detection microphone. It will therefore disrupt the determination of the amplitude of the PA signal originating from the studied gas and therefore the determination of its concentration. It is therefore important to minimize it. To do this, in the embodiment of FIG. 1, the sensor uses a technique of modulation of the wavelength at constant intensity. Specifically, as mentioned above, the PA signal produced by the interaction between the laser and the walls of the cell hardly depends at all on the wavelength. The amplitude of this signal remains constant during the modulation of the wavelength at constant laser intensity and the amplitude of the modulation of the total acoustic signal (gas+walls) detected by the microphone 50 is solely due to the concentration of the studied gaseous species.

The supply circuit therefore generates an electric current suitable for modulating the wavelength of the laser radiation while maintaining a constant laser intensity. To do this, the supply circuit generates an electric current known as the "generation" current, which allows the laser source to be electrically pumped. The generation current is suitable for making the QCL source operate in pulsed mode. The light emission is obtained via the generation-current pulses (above the emission threshold of the QCL). In addition, the supply circuit generates an electric current called the "base current" between each laser pulse. The magnitude of the base current is strictly lower than the emission threshold of the laser source. The two currents are modulated with two envelopes: a "high" envelope that modulates the generation current and a "low" envelope that modulates the base current. Modulating the base current allows the active region of the laser to be heated, this leading to a modulation of the laser wavelength. Modulating the generation current allows the decrease in the efficiency of the laser, which decrease is caused by the heating of the active region of the laser by the base current, to be compensated for. The combined effect of the modulations of the base current and of the generation current is to keep the light intensity of the laser pulses at least approximately constant, even though their wavelength varies periodically. Modulating the generation current therefore allows laser length/intensity coupling to be avoided. In the embodiment of FIG. 1, the modulation of the base current is sinusoidal and the generation current is a square-wave signal modulated by a triangular envelope in order to compensate for a decrease in the efficiency of the QCL laser, which decrease is caused by the heating of the active region of the QCL. The phase shift used and the form of the high envelope in this embodiment are given by way of example. In another embodiment, the phase shift is zero.

As indicated shown by J. Saarela et al., "Wavelength modulation waveforms in laser photoacoustic spectroscopy," Appl. Opt. 48, 743-747 (2009), the form of modulation to be applied is preferably tailored to the profile of the probed gas line. Specifically, the objective is to maximize the signal at the detection harmonic, i.e. the following quantity, where P(t) designates laser power as a function of time, $\lambda(t)$ the wavelength of the laser as a function of time, $\alpha_G(\lambda)$ the absorption of the gas of interest as a function of the wavelength and f the detection frequency:

$$\int_{-\frac{1}{2f}}^{\frac{1}{2f}} P(t)\alpha_G(\lambda(t)) \exp(-2\pi f j t) dt$$

Again according to Saarela et al., Applied Optics, 2009, and for an isolated gas line ($\alpha_G$ possesses a Lorentzian shape), the optimal form is the quasi-square-wave form with a modulation index of 5.

In another embodiment, the modulation of the base current is of PDM type (PDM standing for Pulse Density Modulation). This type of modulation consists in using current pulses that remain below the emission threshold and that are all identical and of set width, but with a variable firing frequency. The higher the density of these pulses over time (high firing frequency), the higher the energy deposited via Joule heating in the laser, the greater the heating of the active region and therefore the stronger the modulation of the wavelength. Conversely, a low pulse density will result in a weak modulation of the wavelength (or a variation of zero).

In one alternative embodiment, the modulation of the base current is of PWM type (PWM standing for Pulse Width Modulation), which consists in using current pulses that remain below the emission threshold and that repeat at a set firing frequency. From one pulse to the next, the width of the pulse varies so that the longer the pulse, the higher the energy deposited via Joule heating in the laser, and therefore the more the wavelength will be modulated. Conversely, a short pulse width will result in a weak modulation of the wavelength (or a variation of zero). The expression "modulation of the base current" therefore here refers either to a modulation of a signal with a (for example sinusoidal) envelope or with a pulsed signal (with a PWM signal for example).

In order to amplify the PA signal produced by the interaction between the light radiation and the gas to be detected contained in the cell 20, the acoustic waves generated via the photo-acoustic effect must be at the resonant frequency of the cell. To achieve this, it is necessary for the wavelength of the light radiation produced by the laser source 10 to be modulated about an absorption maximum of the studied gas, at a frequency equal to half of this resonant frequency. Thus, the period of modulation of the generation current and of the base current must be equal to the reciprocal of half of the resonant frequency of the cell. In the embodiment of FIG. 1, the absorption line of the studied gas is centered on $\lambda_0$. The central wavelength of the QCL then varies between $\lambda_0+\delta\lambda$ and $\lambda_0-\delta\lambda$ at a modulation frequency equal to 1 kHz. The interaction between the laser and the gas then produces a sinusoidal photo-acoustic signal at a frequency of 1 kHz. Lastly, the amplitude of the sinusoidal modulation of the total acoustic signal (gas+walls) detected by the microphone allows the concentration of the studied gas species to be determined. The repetition frequency of the laser pulses is at least 10 times, preferably 100 times, and more preferably 1000 times higher than the resonant frequency of the cell.

The absorption maximum of the gas need not be the central value of the modulation range of the wavelength of the laser radiation. In another embodiment, the maximum gas absorption is an extreme value of the modulation range. In this case, the period of modulation of the generation current and of the base current must be equal to the reciprocal of the resonant frequency of the cell Advantageously, the duration of the pulses is chosen so that they are short enough that the associated spectral width, created by the chirp, does not exceed the typical width of a gas line (of the order of 0.5 $cm^{-1}$ for isolated gas lines). The term "chirp" here refers to the rapid change in wavelength within a pulse, which rapid change is caused by the heating of the active region of the laser by the base current.

In the embodiment of FIG. 1, the internal walls of the gas cell possesses an optical treatment that reflects IR, in order to maximize the laser flux that interacts with the atoms or gas molecules to be studied. The optical reflectance of the cell is, for example, higher than 50% and preferably higher than 75%.

Figure 2:
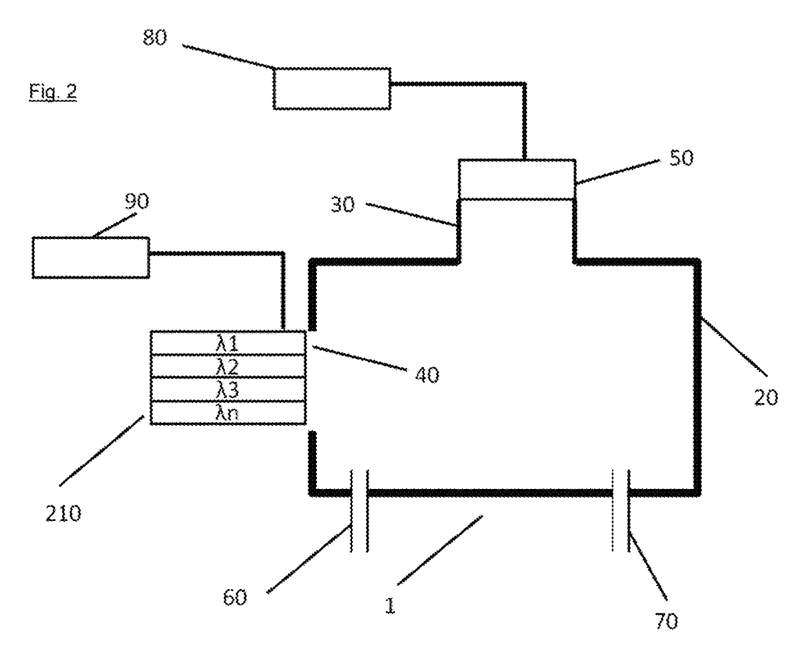
FIG. 2 shows a diagram of a gas sensor according to a second embodiment of the present invention comprising a plurality of laser sources of different wavelengths.

FIG. 2 shows another embodiment of a gas sensor according to the present description. Here, a number n>1 of laser sources 210 emit light radiation into the cell 20. Each laser source possesses a different central wavelength ($\lambda 1$, $\lambda 2$, $\lambda 3$ . . . $\lambda n$) suitable for the excitation of different gases. In this embodiment, the lasers are QCLs that emit between 4 and 10 microns and that operate in pulsed regime at a frequency of 1 MHz. In addition, a supply circuit allows the wavelength of the pulses produced by the laser sources to be varied by varying the base current of the lasers, while maintaining a constant laser intensity. For each laser source, it is therefore possible to avoid the background noise produced by reflections of the laser radiation on the walls of the cell. The embodiment of FIG. 2 therefore has the advantage of being able to characterize various gas species using various wavelengths. Specifically, the natural selectivity of the absorption by a gas of monochromatic laser radiation allows the studied gas species to be easily determined.

Figure 3:
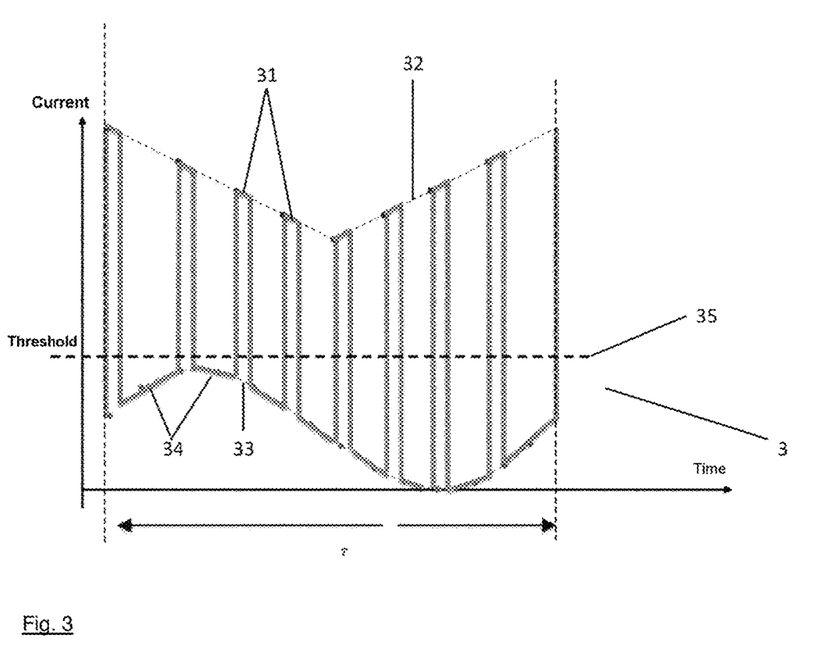
FIG. 3 shows a first example of a waveform of the current with which the laser source used in the sensor of the embodiment in FIG. 1 is fed, allowing the modulation of the wavelength of the laser radiation to be obtained.

FIG. 3 shows an embodiment of the electric current supplied to the laser source that is identical to that implemented in the sensor described with respect to the embodiment of FIG. 1. This graph shows the variation in the magnitude of the supply current as a function of time. As detailed above, the current possesses two envelopes: a "high" envelope 32 that modulates the generation current 31 (generating the laser pulses) and a "low" envelope 34 that modulates the base current 33 between each laser pulse. The laser-emission threshold 35 has been represented by a dashed horizontal line and the magnitude of the base current 33 remains strictly lower than this threshold. In this embodiment, the base current is modulated with a sinusoid the period T of which is equal to the reciprocal of half of the resonant frequency of the cell, i.e. a period of 1 ms. The generation current is modulated with a triangular high envelope of same period as that of the modulation of the base current. In this embodiment, the pulses have a duration of 100 ns with a repetition rate of 1 MHz. Since the resonant frequency of the cell is 2 kHz, the laser operates in QCW regime. This temporal pulse width is short enough to be able to neglect the chirp effect caused by the heating of the active region.

Figure 4:
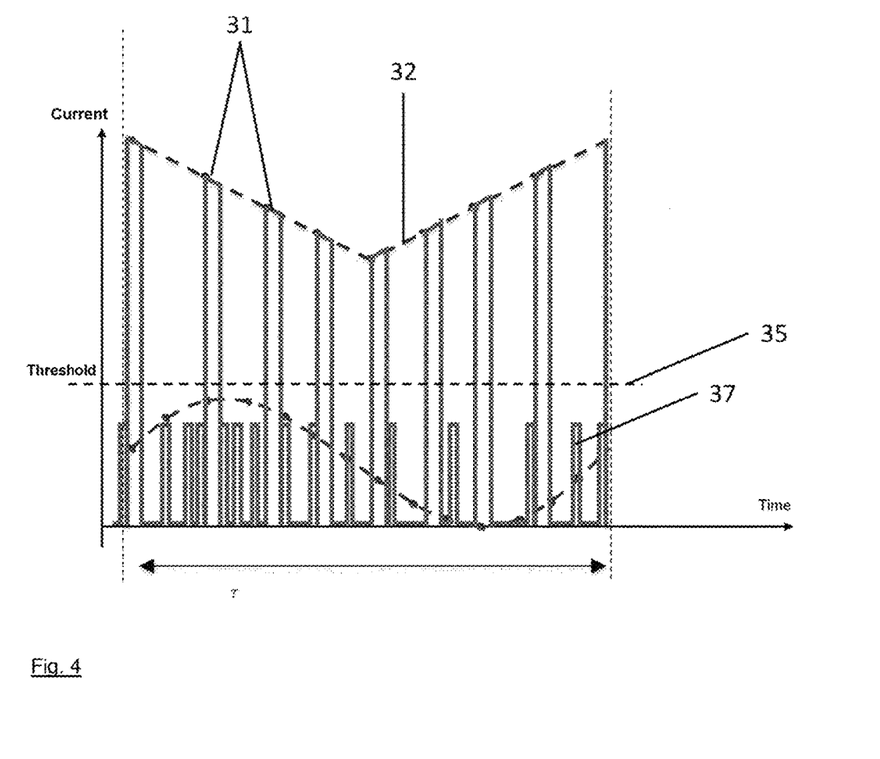
FIG. 4 shows a second example of a waveform of the current with which the laser source is fed, allowing the modulation of the wavelength of the laser radiation to be obtained.
Figure 5:
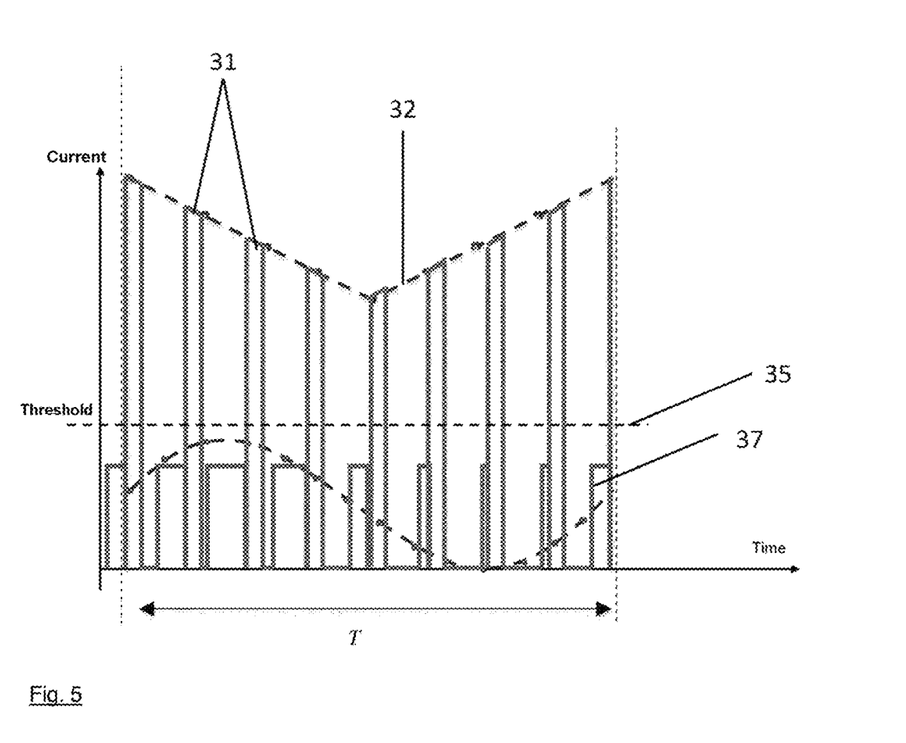
FIG. 5 shows a third example of a waveform of the current with which the laser source is fed, allowing the modulation of the wavelength of the laser radiation to be obtained.

In the embodiment of FIG. 3, the magnitude of the base current is continuously modulated. It is also possible to use a pulsed PDM (FIG. 4) or PWM (FIG. 5) base current 37. From the point of view of the thermal response of the laser, which performs low-pass filtering, these embodiments are equivalent, however, from an electronic point of view, it may be preferable to employ pulsed modulation of the base current rather than magnitude modulation.

The type of laser source 10 is not limited to QCLs. In another embodiment the laser radiation is produced by electrically pumped lasers such as semiconductor lasers. However, semiconductor lasers other than QCLs possess a lower laser-emission threshold, this limiting the ability to inject a base current below the threshold. In addition, this implies that the amplitude of the modulation of the base current will therefore also be lower, this limiting the heating of the active region and therefore the amplitude of modulation of the wavelength. The laser source used will therefore preferably be a QCL source.

In another embodiment, the modulations of the base and generation currents may take other forms than sinusoidal and triangular, respectively. They may take a square-wave, sinusoidal, or triangular form or any other form desired by a person skilled in the art. In another non-preferred embodiment, the magnitude of the generation electric current is not modulated so as to compensate for a decrease in the efficiency of the one or more lasers, which decrease is caused by heating of the active region of the one or more lasers by the base current. Specifically, simply modulating the wavelength periodically by modulating the base current allows the contribution of the noise signal originating from the walls to be decreased. Nevertheless, it is preferable to compensate for a decrease in the efficiency of the one or more lasers so as to obtain a constant laser intensity and thus to avoid the noise that originates from the laser interaction with the walls.

In another non-preferred embodiment, the base current generated by the supply circuit has a magnitude lower than the magnitude of the generation current during the pulses of the laser, but higher than or equal to the laser-emission threshold. This embodiment is sufficient to cause heating of the active region and a modulation of the laser wavelength.

In other embodiments, the detection microphone 50 may be replaced by any other electro-acoustic transducer. It may for example be pre-resonant (tuning fork). In another embodiment, it may be an acoustic-optic-electric transducer.

The invention claimed is:

1. A photo-acoustic gas sensor comprising:
a cell forming an acoustic resonator, comprising a gas inlet duct, a gas outlet duct and at least one aperture called the laser inlet;
at least one electrically pumped laser source;
at least one electro-acoustic transducer; and
a supply circuit that generates a pulsed electric current, called the generation electric current, that pumps the one or more laser sources and that is configured to cause the one or more laser sources to operate in pulsed mode, the repetition frequency of the laser pulses being at least 10 times, preferably 100 times, more preferably 1000 times higher than the resonant frequency of the cell;
wherein the supply circuit is configured to furthermore generate a current, called the base current, that takes non-zero values between laser pulses with a magnitude lower than the magnitude of the generation current during the laser pulses, the magnitude of the base current being modulated so that the one or more laser sources emit, into the cell, light radiation having a wavelength that varies periodically about a central wavelength so as to take, at regular intervals, a value specifically suitable for excitation of a gas to be detected, whereby an interaction between the light radiation and the gas to be detected contained in the cell induces the generation of acoustic waves at a resonant frequency of the cell, the electro-acoustic transducer being arranged so as to make contact with the acoustic waves generated in the cell.

2. The gas sensor as claimed in claim 1, wherein the modulation of the base current is sinusoidal.

3. The gas sensor as claimed in claim 1, wherein the magnitude of the base current generated by the supply circuit is lower than the laser-emission threshold.

4. The gas sensor as claimed in claim 1, wherein the modulation of the base current is of PWM type (PWM standing for Pulse Width Modulation) or of PDM type (PDM standing for Pulse Density Modulation).

5. The gas sensor as claimed in claim 1, wherein the magnitude of the generation electric current is modulated so as to compensate for a decrease in the efficiency of the one or more lasers, which decrease is caused by heating of the active region of the one or more lasers by the base current, so as to obtain a constant laser intensity.

6. The gas sensor as claimed in claim 1, wherein the base current is periodically modulated at a frequency equal to half the resonant frequency of the cell.

7. The gas sensor as claimed in claim 1, comprising a plurality of laser sources of different central wavelengths, suitable for the excitation of different gases.

8. The gas sensor as claimed in claim 1, wherein the one or more laser sources comprise quantum cascade lasers that emit at wavelengths comprised between 4 and 10 microns.

9. The gas sensor as claimed in claim 1, wherein the duration of the laser pulses is shorter than 100 ns.

10. A method for detecting a gas by means of a photo-acoustic gas sensor as claimed in claim 1, comprising:
a step wherein the supply circuit generates the base current between each pulse with a magnitude that is non-zero and lower than the magnitude of the generation current during the laser pulses and the generation current, which pumps the one or more lasers, is configured to cause the one or more lasers to operate in pulsed mode, the magnitude of said base current being modulated so that said or each said laser source emits, into the cell, which forms an acoustic resonator, light radiation having a wavelength that varies periodically about a central wavelength so as to take, at regular intervals, a value specifically suitable for the excitation of a gas to be detected, the generation electric current being modulated so as to compensate for a decrease in the efficiency of the one or more lasers, which decrease is caused by heating of the active region of the one or more lasers by the base current, so as to obtain a constant laser intensity; and
a step of detecting a periodic photo-acoustic signal produced during the interaction between the gas and the laser radiation, using the electro-acoustic transducer of the sensor.

11. The method as claimed in claim 10, wherein the frequency of the periodic variation of the laser wavelength is equal to half the resonant frequency of the cell.

12. The method as claimed in claim 10, wherein the gas sensor comprises a plurality of laser sources of different central wavelengths, suitable for the excitation of different gases.

13. The method as claimed in claim 10, wherein the one or more laser sources comprise quantum cascade lasers that emit between 4 and 10 microns.

* * * * *